United States Patent
Kirsch

(10) Patent No.: US 7,627,737 B2
(45) Date of Patent: Dec. 1, 2009

(54) PROCESSING ELEMENT AND METHOD CONNECTING REGISTERS TO PROCESSING LOGIC IN A PLURALITY OF CONFIGURATIONS

(75) Inventor: Graham Kirsch, Hants (GB)

(73) Assignee: Micron Technology, Inc., Boise, ID (US)

( * ) Notice: Subject to any disclaimer, the term of this patent is extended or adjusted under 35 U.S.C. 154(b) by 316 days.

(21) Appl. No.: 10/442,667

(22) Filed: May 20, 2003

(65) Prior Publication Data

US 2004/0054818 A1 Mar. 18, 2004

(30) Foreign Application Priority Data

Sep. 17, 2002 (GB) ................................. 0221560.6

(51) Int. Cl.
*G06F 15/00* (2006.01)
(52) U.S. Cl. ........................................................ 712/15
(58) Field of Classification Search .................... 712/15
See application file for complete search history.

(56) References Cited

U.S. PATENT DOCUMENTS 4,829,460 A * 5/1989 Ito ............................. 708/209
5,361,367 A   11/1994 Fijany et al. ................. 395/800
5,522,085 A * 5/1996 Harrison et al. ................ 712/32
5,887,160 A * 3/1999 Lauritzen et al. ............. 712/222
6,128,720 A   10/2000 Pechanek et al. .............. 712/20
6,587,941 B1 * 7/2003 Flacks et al. ................. 712/218
6,615,333 B1 * 9/2003 Hoogerbrugge et al. ..... 711/169
6,889,317 B2 * 5/2005 Sami et al. ................... 712/218

FOREIGN PATENT DOCUMENTS

EP    0 726 529 A3    3/1997
EP    0 726 532 A3    3/1997
GB    2 203 574 A    10/1988

OTHER PUBLICATIONS

The D Latch at http://www.play-hookey.com/digital/d_nand_latch.html.*
Computer Organization and Design.*

* cited by examiner

*Primary Examiner*—Aimee J Li
(74) *Attorney, Agent, or Firm*—Dorsey & Whitney LLP

(57) ABSTRACT

A flexible results pipeline for a processing element of a parallel processor is described. A plurality of result registers are selectively connected to each other, to processing logic of the processing element and to a neighborhood connection register configured to receive data from and send data to other processing elements. The connections between the result registers and between the result registers and the neighborhood connection register are selectively configurable by applied control signals.

22 Claims, 3 Drawing Sheets

PROCESSING ELEMENT AND METHOD CONNECTING REGISTERS TO PROCESSING LOGIC IN A PLURALITY OF CONFIGURATIONS

FIELD OF THE INVENTION

The present invention relates to a transferring data between components of a processing element in a parallel processor. More particularly, the present invention relates transferring data between processing logic in the processing element and the inputs and outputs of the processing element.

BACKGROUND TO THE INVENTION

A simple computer generally includes a central processing unit (CPU) and a main memory. The CPU implements a sequence of operations encoded in a stored program. The program and data on which the CPU acts is typically stored in the main memory. The processing of the program and the allocation of main memory and other resources are controlled by an operating system. In operating systems where multiple applications may share and partition resources, the processing performance of the computer can be improved through use of active memory.

Active memory is memory that processes data as well as storing it. It can be instructed to operate on its contents without transferring its contents to the CPU or to any other part of the system. This is typically achieved by distributing parallel processors throughout the memory. Each parallel processor is connected to the memory and operates on it independently of the others. Most of the data processing is performed within the active memory and the work of the CPU is thus reduced to the operating system tasks of scheduling processes and allocating system resources.

A block of active memory typically consists of the following: a block of memory, e.g. dynamic random access memory (DRAM), an interconnection block, and a memory processor (processing element array). The interconnection block provides a path that allows data to flow between the block of memory and the processing element array. The processing element array typically includes multiple identical processing elements controlled by a sequencer. Processing elements are generally small in area, have a low degree of hardware complexity, and are quick to implement, which leads to increased optimisation. Processing elements are usually designed to balance performance and cost. A simple more general-purpose processing element will result in a higher level of performance than a more complex processing element because it can be easily coupled to generate many identical processing elements. Further, because of its simplicity, the processing element will clock at a faster rate.

In any computer system, it is important that data is processed efficiently in order to maximise the speed of the processor. In a parallel processor containing a plurality of processing elements, it is important to maximise the speed of movement of data from an input to the processing element through processing logic to an output of the processing element.

Moreover, it is important to ensure that data generated by one part of the processing element is ready use by another part or by another processing element as and when it is required.

In a parallel processor, in which there is a plurality of processing elements, in addition to transferring data between a particular processing element and its memory or host CPU, often data is transferred between the individual processing elements. This added complexity further increases the complexity of inputting and outputting data from the processing element and can further reduce the speed of the processing element.

Accordingly, it is an object of the present invention to provide efficient scheduling and transfer of data within the processing element.

It is a further object of the present invention to provide a more flexible processing element, within which data can be efficiently transferred between components of the processing element.

It is yet a further object of the present invention to provide faster transfer out of the processing element of results of processing operations occurring therein.

SUMMARY OF THE INVENTION

An active memory device includes a plurality of processing elements each of which includes processing logic and a plurality of result registers. At least one of the result registers is selectively coupled to receive data from the processing logic, and a least one of the result registers is selectively coupled to send data to the processing logic. Connections between the at least one result register in each of the processing elements are selectively configurable to alter the manner in which data are received and sent by the processing logic. Each of the processing elements may also include a register file configured to transfer data between the processing element and either a memory device or a host processor. The register file is selectively connected to one of the result registers to receive data from or transfer data to the result register. Each of the processing elements may also include a neighborhood connection register configured to receive data from or send data to a different processing element in the active memory device. The neighborhood connection register is selectively connected to receive data from or send data to at least one of the result registers in the processing element. The connections between the neighborhood connection register and the result register are selectively configurable.

BRIEF DESCRIPTION OF THE DRAWINGS

A specific embodiment will now be described by way of example only and with reference to the accompanying drawings, in which.

DETAILED DESCRIPTION

Figure 1:
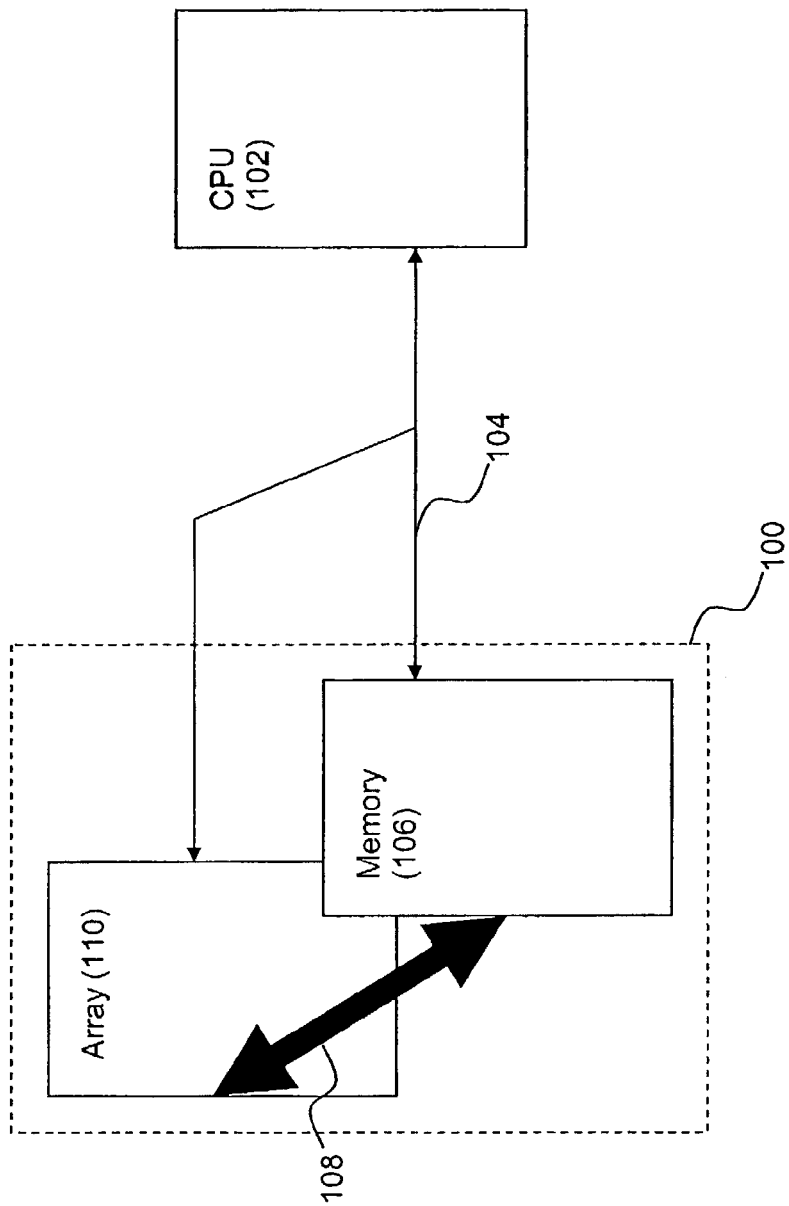
FIG. 1 shows one embodiment of an active memory block in accordance with the present invention.

Referring to FIG. 1, one embodiment of an active memory block in accordance with the invention is shown. Active memory block 100 includes a memory 106 and an array 110 of processing elements. Memory 106 is preferably random access memory (RAM), in particular dynamic RAM (DRAM). The array 110 can communicate with memory 106 via an interconnection block 108. The interconnection block 108 can be any suitable communications path, such as a bi-directional high memory bandwidth path. A central processing unit (CPU) 102 can communicate with active memory block 100 via a communications path 104. The communications path 104 may be any suitable bi-directional path capable of transmitting data.

Figure 2:
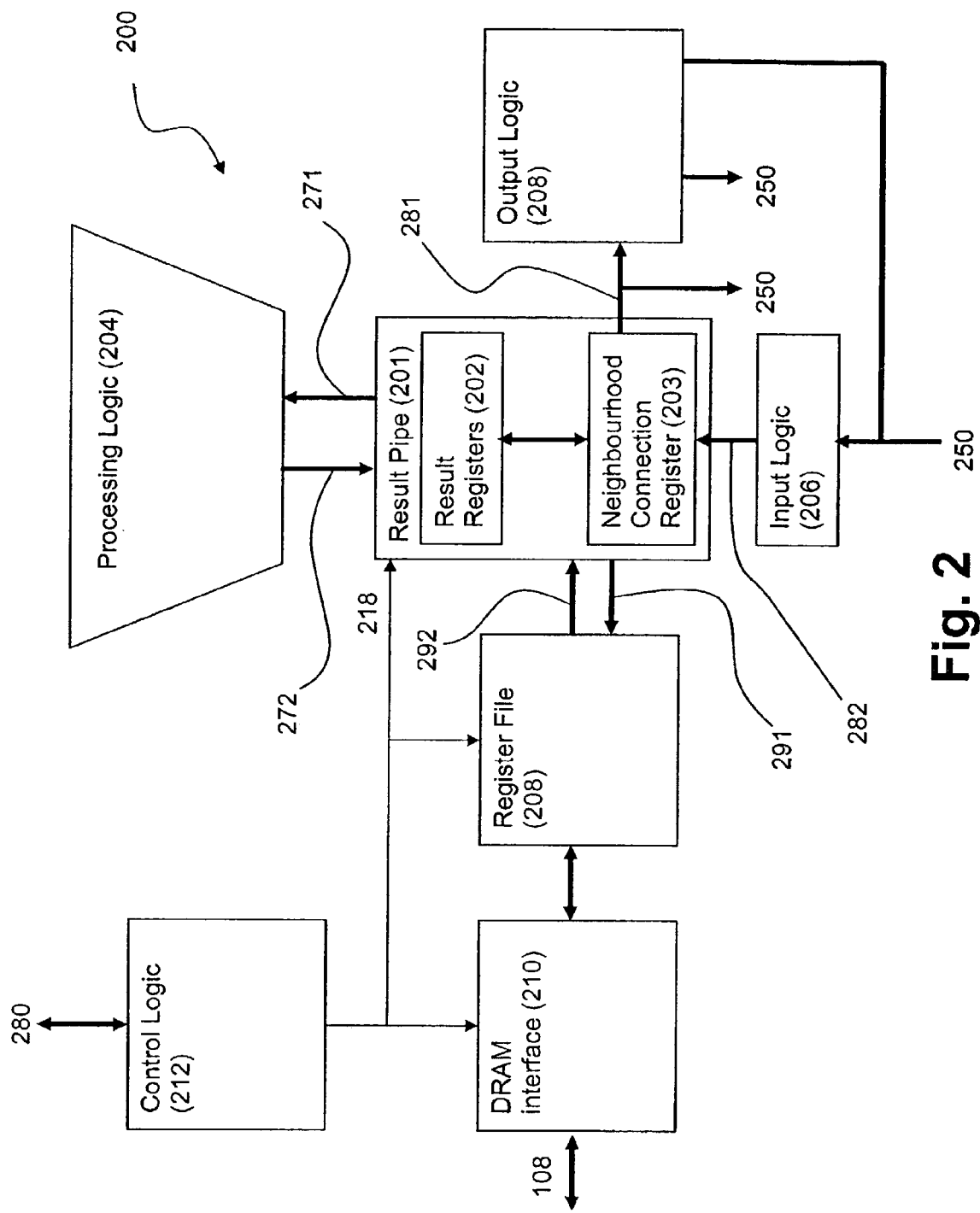
FIG. 2 shows one embodiment of the components interconnections of a processing element of the present invention.

Referring to FIG. 2, the components of one of a number of a processing elements 200 forming the array 110 are shown. The processing element 200 includes processing logic 204, a result pipe 201 including result registers 202 and a neighbourhood connection register 203. The result pipe 201 is connected to a DRAM interface 210 via a register file 208. Data is passed between the memory 106 and the processing element 200 via the DRAM interface 210 and the register file 208. Data is passed from the result registers 202 to the processing logic 204 to be processed. The processing logic 204 passes the results of processing back to the result registers 202. Data from neighbouring processing elements 250 is received via input logic 206 into the neighbourhood connection register 203. Data is output to neighbouring processing elements 250 directly from the neighbourhood connection register 203 or from output logic 208 which may combine the data being output with data from other neighbouring processing elements 250.

The processing logic 204 may comprise a number of different portions (not shown) into which data can be input and data can be output separately. These portions can include an arithmetic logic unit, a corresponding logical unit, shift control registers, condition registers and data shifting blocks.

Control logic 212 is connected to the DRAM interface 210, the register file 208 and the result pipe 201. The control logic 212 receives control commands sent to all of the processing elements in the array 110 and generates control signals 218 which are sent to the result pipe 201 to configure the connections between the result registers 202, the neighbourhood connection register 203 and the components connected to them, i.e. the register file 208, processing logic 204, output logic 208 and input logic 206.

The result pipe is connected to the processing logic 204 via processing logic output and input interconnects 271, 272, to the register file 208 via register file output and input interconnects 291, 292, to the output logic via output interconnect 281, and to the input logic via input interconnect 282. The interconnects are 8-bit (byte) wide data wires between the components of the processing element 200

Figure 3:
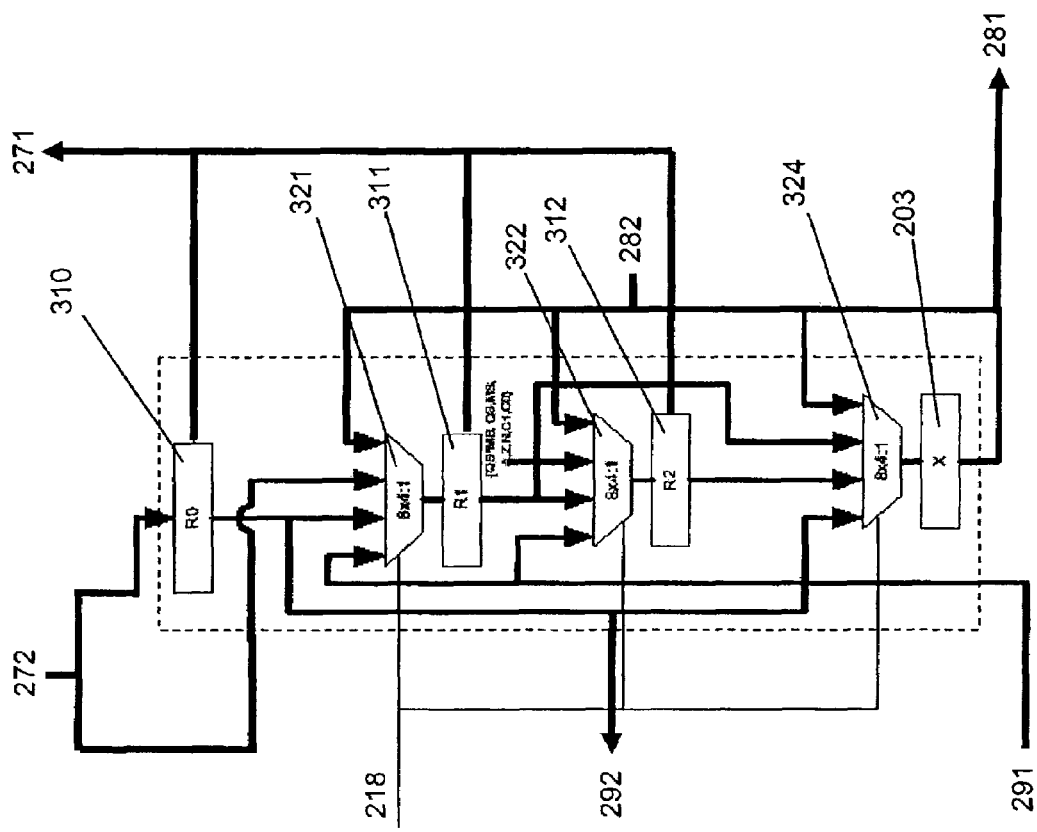
FIG. 3 shows one embodiment of the components and interconnections of a register pipe of the present invention.

Referring to FIG. 3, the components of the result pipe 201 are shown. The result pipe comprises result registers 202 (first, second and third result registers 310, 311, 312) and the neighbourhood connection register 203. At the input to each of the result registers 311, 312, are first and second selection circuits 321, 322 connected to the first and second result registers 311, 312 respectively. There is a neighbourhood connection register selection circuit 324 connected at the input to the neighbourhood connection register 203. The selection circuits each select one of four inputs applied to them for a given configuration of control signals 218 and may comprise 8-bit 4:1 multiplexers, as shown.

The inputs to and outputs from each of the selection circuits are given in Table 1 below:

TABLE 1

Result and neighbourhood connection register inputs/outputs

| Register | Inputs | | | | Outputs |
|---|---|---|---|---|---|
| | 0 | 1 | 2 | 3 | |
| R0 | PL0 | PL1 | | | RF, X, PL |
| R1 | R0 | X | RF | PL2 | R2, R3, PL |

TABLE 1-continued

Result and neighbourhood connection register inputs/outputs

| Register | Inputs | | | | Outputs |
|---|---|---|---|---|---|
| | 0 | 1 | 2 | 3 | |
| R2 | R1 | X | RF | PL3 | X, PL |
| X | P2 | R1 | R0 | IL | OL, R1, R2, X | where:
R0 refers to the first result register 310;
R1 refers to the second result register 311;
R2 refers to the third result register 312;
X refers to the neighbourhood connection register 203;
RF refers to the register file 208;
PL refers to the processing logic 204;
IL refers to the input logic 206;
OL refers to the output logic 208; and
PL1, PI-2 and PL3 refer to different portions of the processing logic from which data can be received.

As can be seen in FIG. 3 and from Table 1, the only input to the register file 208 is from the first result register 310.

As mentioned above, data can be input into the result registers 202 from different portions of the processing logic 204. Such portions include an arithmetic logic unit PL0, a corresponding logical unit PL1, shift control registers PL2 and condition registers PL3. Generally data could be output from each of the result registers 202 to the data shifting blocks (mentioned above).

The use of the selection circuits 321, 322, 324 allows the result and neighbourhood connection registers 202, 203 to be chained together in different configurations. Possible configurations are:

R0 → RI → R2 → X
R0 → X → R1 → R2,
R0 → R1 → X → R2,
R0 → X → R2 where '→' means 'outputs to'.

Thus, data can be input to the neighbourhood connection register 203 from neighbouring processing elements 250, the configuration of the chain can be changed so that the neighbourhood connection register 203 is moved to a different location and the data therein output to the second or third result register 310, 311, 312 having a desired output destination (i.e. a desired portion of the processing logic or register file).

The chain also allows pipelining of data to take place in the processing logic 204 and between the processing logic 204 and the register file 208. As will be appreciated, the results of some processing operations are available before results from other processing operations. Using the flexible results pipeline described, the results of processing operations can be extracted from a given portion of the processing logic 204 before results from other portions. This extracted data can then be output from the result pipe 201, either to the register file 208 or to the output logic 208 so that it can be output from the processing element 200 before the results from the other portions are available. In addition, the chain allows one or more results of a first processing operations which are available before the entire first operations has completed to be fed back into the processing logic 204 to be used in a second operation whilst the first operation completes. Moreover, it allows results to be delayed whilst other results or data with which they are to be combined are made available.

In conclusion, the present invention allows data processing in processing elements in a parallel processor to occur at a higher rate. Data can be processed and output at a higher rate from the processing elements since pipelining can occur. The flexible positioning of the neighbourhood connection register 203 within the result pipe 201 helps facilitate this.

It will of course be understood that the present invention has been described above purely by way of example and modifications of detail can be made within the scope of the invention.

The invention claimed is:

1. A processing element for a parallel processor, comprising:
   processing logic;
   first and second result registers each of which has an input and an output;
   a neighborhood connection register;
   a register connection selection circuit coupled to the processing logic and to the result registers, the register connection selection circuit including a feedback signal path structured to selectively couple the output of the second result register to the input of the first result register to allow a result of a processing operation stored in the second result register to be fed back to the first result register; and
   a neighborhood connection register selection circuit coupled to the neighborhood connection register and at least one of the first and second result registers, the register connection selection circuit being responsive to a first control signal, and the neighborhood connection register selection circuit being responsive to a second control signal, the register connection selection circuit and the neighborhood connection register being configured to selectively couple the first and second result registers, the processing logic and the neighborhood connection register to each other in a plurality of different configurations, each of the different configurations having a different order in which at least some of the first and second result registers, the processing logic and the neighborhood connection register are coupled to each other.

2. The processing element of claim 1 wherein the neighborhood connection register selection circuit is further responsive to the second control signal to selectively couple an input of the neighborhood connection register to an output of the neighborhood connection register.

3. The processing element of claim 1, further comprising a control circuit generating the first and second control signals responsive to receiving and decoding control commands.

4. The processing element of claim 1 wherein the register connection selection circuit comprises a multiplexer.

5. The processing element of claim 1 wherein the processing logic comprises a plurality of output terminals providing signals at different processing stages, and wherein the register connection selection circuit is configured to couple the first and second result registers to the output terminals of the processing logic in different configurations.

6. The processing element of claim 1 wherein the processing logic comprises a plurality of input terminals receiving signals for processing at different processing stages, and wherein the register connection selection circuit is configured to couple the first and second result registers to the input terminals of the processing logic in different configurations.

7. An active memory system, comprising:
   a memory device;
   a host processor; and
   a processing element coupled to the memory device and the host processor, the processing element comprising:
   processing logic;
   first and second result registers;
   a neighborhood connection register;
   a register connection selection circuit coupled to the processing logic and to the result registers the register connection selection circuit including a feedback signal path structured to selectively couple the output of the second result register to the input of the first result register to allow a result of a processing operation stored in the second result register to be fed back to the first result register; and
   a neighborhood connection register selection circuit coupled to the neighborhood connection register and at least one of the first and second result registers, the register connection selection circuit being responsive to a first control signal, and the neighborhood connection register selection circuit being responsive to a second control signal, the register connection selection circuit and the neighborhood connection register being configured to selectively couple the first and second result registers, the processing logic and the neighborhood connection register to each other in a plurality of different configurations. each of the different configurations having a different order in which at least some of the first and second result registers, the processing logic and the neighborhood connection register are coupled to each other.

8. The active memory system of claim 7, further comprising a register file configured to transfer data between the processing element and one of the memory device and the host processor, at least one of the first and second result registers being selectively coupled to receive data from the register file and at least one of the first and second result registers being selectively coupled to send data to the register file.

9. The active memory system of claim 7 wherein the neighborhood connection register selection circuit is further responsive to the second control signal to selectively couple an input of the neighborhood connection register to an output of the neighborhood connection register.

10. The active memory system of claim 7, further comprising a control circuit generating the first and second control signals responsive to receiving and decoding control commands.

11. The active memory system of claim 7 wherein the register connection selection circuit comprises a multiplexer.

12. The active memory system of claim 7 wherein the processing logic comprises a plurality of output terminals providing signals at different processing stages, and wherein the register connection selection circuit is configured to couple the first and second result registers to the output terminals of the processing logic in different configurations.

13. The active memory system of claim 7 wherein the processing logic comprises a plurality of input terminals receiving signals for processing at different processing stages, and wherein the register connection selection circuit is configured to couple the first and second result registers to the input terminals of the processing logic in different configurations.

14. A processing element for a parallel processor, comprising:
   i. processing logic;
   ii. first and second result registers each of which has an input and an output;
   iii. a neighborhood connection register;

iv. a register connection selection circuit coupled to the processing logic and to the result registers, the register connection selection circuit including a feedback signal path structured to selectively couple the output of the second result register to the input of the first result register to allow a result of a processing operation stored in the second result register to be fed back to the first result register; and v. a register connection selection circuit being responsive to a first control signal, and the neighborhood connection register selection circuit being responsive to a second control signal; the register connection selection circuit and the neighborhood connection register being configured to selectively couple the first and second result registers, the processing logic and the neighborhood connection register to each other in a plurality of different configurations, each of the different configurations having a different order in which at least some of the first and second result registers, the processing logic and the neighborhood connection register are coupled to each other.

15. The processing element of claim 14 wherein the register connection selection circuit comprises a multiplexer.

16. The processing element of claim 14 wherein the processing logic comprises a plurality of output terminals providing signals at different processing stages, and wherein the register connection selection circuit is configured to couple the first and second result registers to the output terminals of the processing logic in different configurations.

17. An active memory system, comprising:
   vi. a memory device;
   vii. a host processor; and
   viii. a processing element coupled to the memory device and the host processor, the processing element comprising:
   ix. processing logic;
   x. first and second result registers;
   xi. a neighborhood connection register;
   xii. a register connection selection circuit coupled to the processing logic and to the result registers, the register connection selection circuit including a feedback signal path structured to selectively couple the output of the second result register to the input of the first result register to allow a result of a processing operation stored in the second result register to be fed back to the first result register; and
   xiii. a register connection selection circuit being responsive to a first control signal, and the neighborhood connection register selection circuit being responsive to a second control signal; the register connection selection circuit and the neighborhood connection register being configured to selectively couple the first and second result registers, the processing logic and the neighborhood connection register to each other in a plurality of different configurations, each of the different configurations having a different order in which at least some of the first and second result registers, the processing logic and the neighborhood connection register are coupled to each other.

18. An active memory system, comprising:
    a memory device;
    a host processor; and
    a processing element coupled to the memory device and the host processor, the processing element comprising:
        processing logic;
        first and second result registers;
        a neighborhood connection register;
        a register connection selection circuit coupled to the processing logic and to the result registers, the register connection selection circuit including a feedback signal path structured to selectively couple the output of the second result register to the input of the first result register to allow a result of a processing operation stored in the second result register to be fed back to the first result register; and
        the register connection selection circuit being responsive to a first control signal, and the neighborhood connection register selection circuit being responsive to a second control signal; the register connection selection circuit and the neighborhood connection register being configured to selectively couple the first and second result registers, the processing logic and the neighborhood connection register to each other in a plurality of different configurations, each of the different configurations having a different order in which at least some of the first and second result registers, the processing logic and the neighborhood connection register are coupled to each other.

19. The active memory system of claim 18, further comprising a register file configured to transfer data between the processing element and one of the memory device and the host processor, at least one of the first and second result registers being selectively coupled to receive data from the register file and at least one of the first and second result registers being selectively coupled to send data to the register file.

20. The active memory system of claim 18 wherein the register connection selection circuit comprises a multiplexer.

21. The active memory system of claim 18 wherein the processing logic comprises a plurality of output terminals providing signals at different processing stages, and wherein the register connection selection circuit is configured to couple the first and second result registers to the output terminals of the processing logic in different configurations.

22. The active memory system of claim 18 wherein the processing logic comprises a plurality of input terminals receiving signals for processing at different processing stages, and wherein the register connection selection circuit is configured to couple the first and second result registers to the input terminals of the processing logic in different configurations.

* * * * *

UNITED STATES PATENT AND TRADEMARK OFFICE
CERTIFICATE OF CORRECTION

PATENT NO. : 7,627,737 B2
APPLICATION NO. : 10/442667
DATED : December 1, 2009
INVENTOR(S) : Graham Kirsch It is certified that error appears in the above-identified patent and that said Letters Patent is hereby corrected as shown below:

On the Title Page Item (57), under "Abstract", line 7, after "between the result registers and" delete "between the result registers and".

In column 6, line 25, in Claim 7, delete "configurations." and insert -- configurations, --, therefor.

In columns 7, lines 30-57 and in column 8, lines 1-3, below "configurations." delete
"17. An active memory system, comprising:
vi. a memory device; vii. a host processor; and
viii. a processing element coupled to the memory device and the host processor, the processing element comprising:
ix. processing logic;
x. first and second result registers;
xi. a neighborhood connection register;
xii. a register connection selection circuit coupled to the processing logic and to the result registers, the register connection selection circuit including a feedback signal path structured to selectively couple the output of the second result register to the input of the first result register to allow a result of a processing operation stored in the second result register to be fed back to the first result register; and
xiii. a register connection selection circuit being responsive to a first control signal, and the neighborhood connection register selection circuit being responsive to a second control signal; the register connection selection circuit and the neighborhood connection register being configured to selectively couple the first and second result registers, the processing logic and the neighborhood connection register to each other in a plurality of different configurations, each of the different configurations having a different order in which at least some of the first and second result registers, the processing logic and the neighborhood connection register are coupled to each other." and insert -- 17. The processing element of claim 14 wherein the processing logic comprises a plurality of input terminals receiving signals for processing at different processing stages, and wherein the register connection selection circuit is configured to couple the first and second result registers to the input terminals of the processing logic in different configurations. --, therefor.

In column 8, line 20, in Claim 18, delete "the register" and insert -- a register --, therefor.

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,627,737 B2
APPLICATION NO. : 10/442667
DATED : December 1, 2009
INVENTOR(S) : Graham Kirsch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 453 days.

Signed and Sealed this

Twenty-first Day of December, 2010

David J. Kappos
*Director of the United States Patent and Trademark Office*